3,459,737
NOVEL 5-SUBSTITUTED 5,6-DIHYDRO-6-OXO-
PYRIDO[2,3-b] [1,4]BENZOXAZEPINES
Gunther Schmidt, Biberach an der Riss, Germany, assignor to Boehringer Ingelheim G.m.b.H., Ingelheim am Rhein, Germany, a corporation of Germany
No Drawing. Continuation-in-part of application Ser. No. 438,374, Mar. 9, 1965. This application Apr. 6, 1965, Ser. No. 446,085
The portion of the term of the patent subsequent to Apr. 2, 1985, has been disclaimed
Claims priority, application Germany, Apr. 21, 1964, T 26,051
Int. Cl. C07d 87/54; A61k 27/00
U.S. Cl. 260—239.3                            9 Claims

ABSTRACT OF THE DISCLOSURE

The present invention relates to novel derivatives of 5,6 - dihydro - 6 - oxo - pyrido[2,3-b][1,4]benzoxazepines. These compounds are useful as antipyretics, sedatives, anticonvulsants, antiphlogistics, analgesics, antitussives and antiemetics in warm-blooded animals.

---

This is a continuation-in-part of copending application Ser. No. 438,374, filed Mar. 9, 1965, now U.S. Patent 3,376,289.

This invention relates to novel 5-substituted 5,6-dihydro - 6 - oxo - pyrido[2,3-b][1,4]benzoxazepines and acid addition salts thereof, as well as to various methods of preparing these compounds.

More particularly, the present invention relates to novel derivatives of 5,6-dihydro-6-oxo-pyrido[2,3-b][1,4]benzoxazepines of the formula

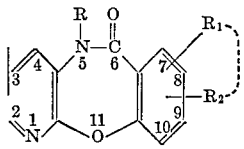

(I)

wherein

R is straight or branched lower alkyl, which may have a halogen, a lower alkoxy, a lower alkylthio or a basic substituent of the formula

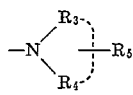

where $R_3$ and $R_4$ are lower alkyl or, together with each other and the nitrogen atom to which they are attached, form a basic heterocyclic ring which may comprise one or more additional hetero-atoms, and $R_5$ is hydrogen or lower alkyl, attached thereto; lower alkenyl; halo-lower alkenyl; or aralkyl whose aromatic moiety may have one or more halogen, lower alkyl, lower alkoxy, amino, lower alkylamino or acylamino substituents attached thereto; and $R_1$ and $R_2$, which may be identical or different from each other, are hydrogen, halogen, lower alkyl, lower alkoxy, hydroxyl, acyloxy, amino, acylamino, acyl or, together with each other and adjacent carbon atoms of the benzene ring to which they are attached, form an aromatic ring, such as a benzene ring;

and their non-toxic, pharmacologically acceptable acid addition salts.

The free base compounds according to the present invention, that is, those embraced by Formula I above, may be prepared by first converting a 5,6-dihydro-6-oxo-pyrido-[2,3-b][1,4]benzoxazepine of the formula

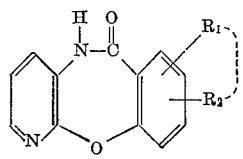

(II)

wherein $R_1$ and $R_2$ have the same meanings as in Formula I, into a corresponding 5-alkali metal derivative, and thereafter reacting the alkali metal derivative with a compound of the formula

RX                            (III)

wherein

R has the same meanings as in Formula I and X is the anion moiety of a reactive ester, such as halogen, sulfate or sulfonyl.

It is self-evident, of course, that if either of both of substituents $R_1$ and $R_2$ in Compound II are free amino, this amino group must be blocked with protective groups, such as acyl, prior to the reaction with Compound III, and the protective groups must be split off again by conventional methods to obtain an end product of the Formula I wherein $R_1$ or $R_2$ or both are free amino.

The conversion of a 5,6-dihydro-6-oxo-pyrido[2,3-b][1,4]benzoxazepine of the Formula II into its 5-alkali metal analog may, for example, be effected by means of an alkali metal hydroxide, an alkali metal alcoholate, an alkali metal amide or an alkali metal hydride. The conversion reaction is preferably carried out at elevated temperatures and in the presence of an inert organic solvent; in the event that an alkali metal hydroxide is used, the reaction may also be carried out in the presence of an aqueous organic solvent.

The alkali meal analog of Compound II need not be isolated prior to its reaction with Compound III. In other words, the solution or suspension containing the alkali metal analog which is formed by the conversion reaction described above may be reacted directly with the compound of the Formula III at elevated temperatures, preferably at the boiling point of the solvent medium of the solution or suspension containing the alkali metal analog, or at the boiling point of the Compound III, whichever is lower. The reaction mixture is then worked up in customary fashion, such as by extracting the reaction product with an immiscible solvent and evaporating the extract solution.

A compound of the Formula I wherein R is a basic substituent forms acid addition salts and especially non-toxic, pharmacologically acceptable acid addition salts with inorganic or organic acids. If desired, such a basic compound may be converted into its acid addition salts by known methods; for instance, by dissolving the free base in a suitable solvent and acidifying the solution with the desired acid. Examples of non-toxic, pharmacologically acceptable acid addition salts are those formed with hydrochloric acid, hydrobromic acid, sulfuric acid, phosphoric acid, acetic acid, maleic acid, citric acid, succinic acid, malic acid, fumaric acid, 2-furoic acid, 8-chlorotheophylline and the like.

The 5,6 - dihydro-6-oxo-pyrido[2,3-b][1,4]benzoxazepines of the Formula II and methods for their preparation are fully described in said copending application Ser. No. 438,374.

The following examples further illustrate the present invention and will enable others skilled in the art to understand it more completely. It should be understood,

EXAMPLE 1

Preparation of 5-methyl-5,6-dihydro-6-oxo-pyrido[2,3-b][1,4]benzoxazepine 10.6 gm. (0.05 mol) of 5,6-dihydro-6-oxo-pyrido[2,3-b][1,4]benzoxazepine were dissolved in a sodium isopropylate solution which was prepared from 2.3 gm. (0.1 gm.-atom) of sodium and 50 cc. of isopropanol. The resulting solution was heated to its boiling point, and then 14.2 gm. (0.1 mol) of methyliodide were added dropwise thereto. After all of the methyliodide had been added, the reaction mixture was refluxed for four hours, then allowed to cool, aqueous sodium carbonate solution was added until the reaction solution was slightly alkaline, and the alkaline solution was extracted several times with ether. The ether extract solutions were combined and evaporated in vacuo, and the residue was recrystallized from n-butanol. A compound having a melting point of 137–139° C. was obtained, which was identified to be 5 - methyl - 5,6-dihydro-6-oxo-pyrido[2,3-b][1,4]benzoxazepine of the formula

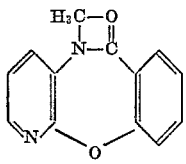

*Analysis.*—$C_{13}H_{10}N_2O_2$; mol. wt. 226.2. Calculated: C, 69.01%; H, 4.46%; N, 12.38%. Found: C, 69.00%; H, 4.51%; N, 12.18%.

EXAMPLE 2

Preparation of 5-ethyl-5,6-dihydro-6-oxo-pyrido[2,3-b][1,4]benzoxazepine 21.2 gm. (0.1 mol) of 5,6-dihydro-6-oxo-pyrido[2,3-b][1,4]benzoxazepine were dissolved in a warm ethanolic solution of potassium hydroxide which was prepared from 11.2 gm. (0.2 mol) of potassium hydroxide and 100 cc. of absolute ethanol. The resulting solution was heated to its boiling point, and then a solution of 31.2 gm. (0.2 mol) of ethyliodide in 100 cc. of absolute ethanol was added dropwise thereto. After all of the ethyliodide had been added, the reaction mixture was refluxed for six hours. Subsequently, the potassium iodide which had precipitated out was filtered off, and the filtrate was evaporated in vacuo. The residue was admixed with aqueous potassium carbonate, and the mixture was extracted several times with ether. The combined ether extract solutions were evaporated, and the residue was recrystallized from cyclohexane. A compound having a melting point of 111–112° C. was obtained, which was identified to be 5 - ethyl - 5,6-dihydro-6-oxo-pyrido[2,3-b][1,4]benzoxazepine of the formula

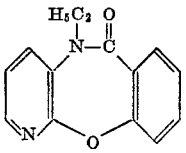

*Analysis.*—$C_{14}H_{12}N_2O_2$; mol. wt. 240.2. Calculated: C, 69.99%; H, 5.04%; N, 11.66%. Found: C, 70.00%; H, 4.89%; N, 11.65%.

EXAMPLE 3

Preparation of 5-(β-dimethylamino-ethyl)-5,6-dihydro-6-oxo-pyrido[2,3-b][1,4]benzoxazepine and its hydrochloride Using a procedure analogous to that described in Example 2, 5 - (β - dimethylamino - ethyl)-5,6-dihydro-6-oxo-pyrido[2,3-b][1,4]benzoxazepine, M.P. 91–92° C. (recrystallized from cyclohexane), of the formula

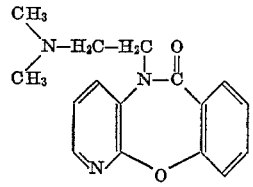

was prepared from 0.1 mol of 5,6-dihydro-6-oxo-pyrido[2,3-b][1,4]benzoxazepine, 0.3 mol of potassium hydroxide and 0.3 mol of β-dimethylamino-ethyl chloride.

*Analysis.*—$C_{16}H_{17}N_3O_2$; mol. wt. 283.3. Calculated: C, 67.82%; H, 6.05%; N, 14.83%. Found: C, 68.00%; H, 6.17%; N, 15.10%.

The free base thus obtained was dissolved in absolute benzene, and the resulting solution was acidified with ethereal hydrochloric acid. The precipitate formed thereby was collected and recrystallized from isopropanol. The purified product had a melting point of 256° C. (decomposition) and was identified to be the hydrochloride of 5 - (β - dimethylamino - ethyl)-5,6-dihydro-6-oxo-pyrido[2,3-b][1,4]benzoxazepine.

*Analysis.*—$C_{16}H_{18}ClN_3O_2$; mol. wt. 319.8. Calculated: C, 60.09%; H, 5.67%; N, 13.14%. Found: C, 60.10%; H, 5.83%; N, 12.92%.

EXAMPLE 4

Preparation of 5-methyl-5,6-dihydro-6-oxo-8-chloro-pyrido[2,3-b][1,4]benzoxazepine 4.9 gm. (0.02 mol) of 5,6-dihydro-6-oxo-8-chloro-pyrido[2,3-b][1,4]benzoxazepine were dissolved in an ethanolic potassium ethylate solution which was prepared from 1.6 gm. (0.4 gm.-atom) of potassium and 200 cc. of absolute ethanol. Thereafter, 5.7 gm. (0.04 mol) of methyliodide were added to the solution, and the mixture was refluxed for seven hours. Subsequently, the potassium iodide which had separated out was filtered off, the filtrate was evaporated in vacuo, and the residue was first washed with water and then recrystallized from ethanol. A compound having a melting point of 181–183° C. was obtained, which was identified to be 5-methyl-5,6-dihydro-6-oxo-8-chloro-pyrido[2,3-b][1,4]benzoxazepine of the formula

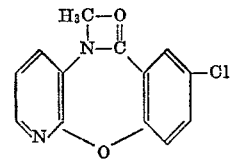

*Analysis.*—$C_{13}H_9ClN_2O_2$; mol. wt. 260.7. Calculated: C, 59.89%; H, 3.48%; N, 10.75%; Cl, 13.60%. Found: C, 59.60%; H, 3.54%; N, 10.64%; Cl, 13.43%.

EXAMPLE 5

Preparation of 5-(β-dimethylamino-ethyl)-5,6-dihydro-6-oxo-8-chloropyrido[2,3-b][1,4]benzoxazepine 8.7 gm. (0.035 mol) of 5,6-dihydro-6-oxo-8-chloro-pyrido[2,3-b][1,4]benzoxazepine were dissolved in a solution of potassium isopropylate in isopropanol which had been prepared from 1.4 gm. (0.036 gm.-atom) of potassium and 100 cc. of isopropanol. 200 cc. of absolute toluene were added to the solution, the isopropanol was distilled off, and the resulting suspension of the 5-potassium analog of the benzoxazepine compound in toluene was heated to its boiling point. While the suspension was boiling, a solution of 5.15 gm. (0.05 mol) of β-dimethylaminoethyl chloride in 50 cc. of absolute toluene was added dropwise. After all of the dimethylaminoethyl chloride solution had been added, the mixture was refluxed for thirty hours. Subsequently, the reaction mixture was allowed to cool and was then extracted several times with aqueous 10% hydrochloric acid. The extract solutions were combined, made alkaline with sodium hydroxide, and the oil which separated out was extracted with ether. The ether extract solution was dried over sodium sulfate, the ether was evaporated, and the residue was distilled in vacuo. The fraction passing over at 194° C./0.1 mm. Hg was identified to be 5-(β-dimethylamino-ethyl)-5,6-dihydro-6-oxo-8-chloro-pyrido[2,3 - b][1,4]benzoxazepine of the formula

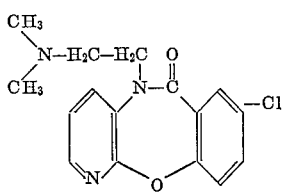

*Analysis.*—$C_{16}H_{16}ClN_3O_2$; mol. wt. 317.8. Calculated: C, 60.47%; H, 5.07%; N, 13.23%; Cl, 11.16%. Found: C, 60.70%; H, 5.28%; N, 13.00%; Cl, 11.23%.

EXAMPLE 6

Preparation of 5-p-chlorobenzyl-5,6-dihydro-6-oxo-8-tert. butyl-pyrido[2,3-b][1,4]benzoxazepine Using a procedure analogous to that described in Example 2, 5,6-dihydro-6-oxo-8-tert.butyl-pyrido[2,3-b][1,4]benzoxazepine was converted into its 5-potassium analog with ethanolic potassium hydroxide, which was then reacted with p-chlorobenzyl chloride. After filtering off the precipitated potassium iodide the filtrate was evaporated in vacuo, the oily residue was stirred with a small amount of gasoline, whereby it crystallized, and the crystalline product was recrystallized from isopropanol. A compound having a melting point of 185–187° C. was obtained, which was identified to be 5-p-chlorobenzyl-5,6-dihydro-6-oxo-8-tert.butyl-pyrido[2,3 - b][1,4]benzoxazepine of the formula

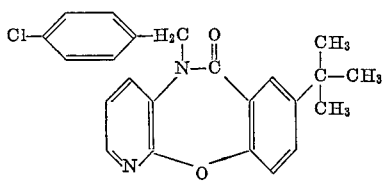

*Analysis.*—$C_{23}H_{21}ClN_2O_2$; mol. wt. 392.9. Calculated: C, 70.31%; H, 5.39%; Cl, 9.02%; N, 7.13%. Found: C, 70.10%; H, 5.58%; Cl, 9.04%; N, 7.27%.

EXAMPLE 7

Preparation of 5-methyl-5,6-dihydro-6-oxo-naphtho[2,3-f]pyrido[2,3-b][1,4]oxazepine 2.4 gm. (0.06 gm.-atom) of potassium were dissolved in 40 cc. of boiling tert.butanol while stirring and passing nitrogen therethrough. Thereafter, 100 cc. of asbolute dioxane were added to the solution, and the mixture was refluxed for fifteen minutes. To the resulting solution 13.1 gm. (0.05 mol) of 5,6-dihydro-6-oxo - naphtho[2,3 - f] pyrido[2,3-b][1,4]oxazepine were added, the mixture was refluxed for thirty minutes, and then, while stirring, a solution of 10.0 gm. (0.07 mol.) of methyliodide in 30 cc. of absolute dioxane was added dropwise. The reaction solution was then refluxed for four hours, the precipitated potassium iodide was filtered off, and the filtrate was evaporated in vacuo. The residue was recrystallized from isopropanol, yielding a compound having a melting point of 203–205° C. which was identified to be 5-methyl-5,6-dihydro-6-oxo-naphtho[2,3-f]pyrido[2,3 - b][1,4]oxazepine of the formula

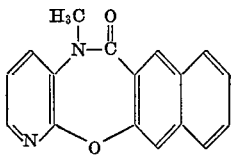

*Analysis.*—$C_{17}H_{12}N_2O_2$; mol. wt. 276.3. Calculated: C, 73.90%; H, 4.38%; N, 10.14%. Found: C, 73.60%; H, 4.57%; N, 10.47%.

EXAMPLE 8

Using a procedure analogous to that described in Example 2, 5-(β-piperidino-ethyl)-5,6-dihydro-6-oxo-pyrido [2,3-b][1,4]benzoxazepine, M.P. 113–115° C. (recrystallized from cyclohexane), of the formula

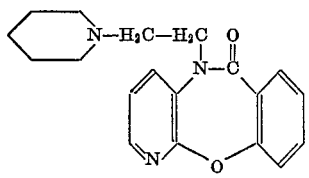

was prepared from 5,6-dihydro-6-oxo-pyrido[2,3-b][1,4] benzoxazepine, ethanolic potassium hydroxide and β-piperidinoethyl chloride.

*Analysis.*—$C_{19}H_{21}N_3O_2$; mol. wt. 323.4. Calculated: C, 70.57%; H, 6.55%; N, 12.99%. Found: C, 70.80%; H, 6.69%; N, 12.91%.

Its hydrochloride decomposed above 150° C.

*Analysis.*—$C_{19}H_{22}ClN_3O_2$; mol. wt. 359.9. Calculated: C, 63.42%; H, 6.16%; Cl, 9.85%; N, 11.68%. Found: C, 63.70%; H, 6.29%; Cl, 9.90%; N, 11.97%.

EXAMPLE 9

Using a procedure analogous to that described in Example 2, 5-(β-morpholino-ethyl)-5,6-dihydro-6-oxopyrido [2,3-b][1,4]benzoxazepine, M.P. 123–125° C. (recrystallized from a mixture of isopropanol and methylcyclohexane), of the formula

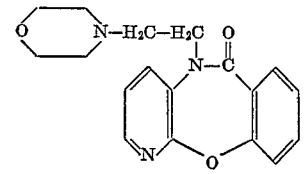

was prepared from 5,6-dihydro-6-oxo-pyrido[2,3-b][1,4] benzoxazepine, ethanolic potassium hydroxide and β-morpholinoethyl chloride.

*Analysis.*—$C_{18}H_{19}N_3O_3$; mol. wt. 325.4. Calculated: C, 66.45%; H, 5.89%; N, 12.92%. Found: C, 66.40%; H, 5.93%; N, 13.05%.

EXAMPLE 10

Using a procedure analogous to that described in Example 2, 5-[γ-(N'-methyl-piperazino)-n-propyl]-5,6-dihydro-6-oxo-pyrido[2,3-b][1,4]benzoxazepine, M.P. 83–85° C. (recrystallized from gasoline), of the formula

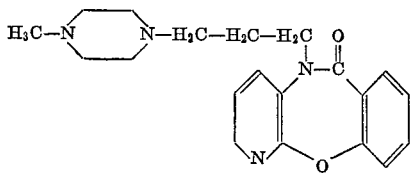

was prepared from 5,6-dihydro-6-oxo-pyrido[2,3-b][1,4] benzoxazepine, ethanolic potassium hydroxide and 1-methyl-4-(γ-chloro-n-propyl)-piperazine.

*Analysis.*—$C_{20}H_{24}N_4O_2$; mol. wt. 352.4. Calculated: C, 68.15%; H, 6.87%; N, 15.90%. Found: C, 67.60%; H, 7.01%; N, 15.60%.

EXAMPLE 11

Using a procedure analogous to that described in Example 2, 5-(γ-chloro-n-propyl)-5,6-dihydro-6-oxo-pyrido[2,3-b][1,4]benzoxazepine, M.P. 94.5–95.5° C. (recrystallized from cyclohexane), of the formula

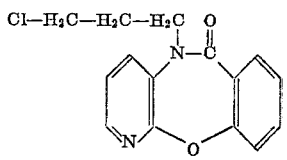

was prepared from 5,6-dihydro-6-oxo-pyrido[2,3-b][1,4]benzoxazepine, potassium hydroxide and 1-chloro-3-bromopropane.

*Analysis.*—$C_{15}H_{13}ClN_2O_2$; mol. wt. 288.7. Calculated: C, 62.39%; H, 4.54%; N, 9.71%; Cl, 12.28%. Found: C, 62.30%; H, 4.74%; N, 9.89%; Cl, 12.07%.

EXAMPLE 12

Using a procedure analogous to that described in Example 2, 5-(β-methoxy-ethyl)-5,6-dihydro-6-oxo-pyrido[2,3-b][1,4]benzoxazepine, B.P. 165–170° C. at 0.05 mm. Hg, M.P. 75–77° C. (recrystallized from a mixture of ether and petroleum ether), of the formula

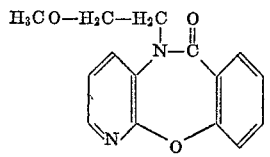

was prepared from 5,6-dihydro-6-oxo-pyrido[2,3-b][1,4]benzoxazepine, potassium hydroxide and β-methoxyethyl iodide.

*Analysis.*—$C_{15}H_{14}N_2O_3$; mol. wt. 270.3. Calculated: C, 66.65; H, 5.22%; N, 10.37%. Found: C, 66.65%; H, 5.22%; N, 10.45%.

EXAMPLE 13

Using a procedure analogous to that described in Example 2, 5,10-dimethyl-5,6-dihydro-6-oxo-pyrido[2,3-b][1,4]benzoxazepine, M.P. 149–150° C. (recrystallized from isopropanol), of the formula

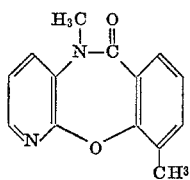

was prepared from 5,6-dihydro-6-oxo-10-methyl-pyrido[2,3-b][1,4]benzoxazepine, potassium hydroxide and methyliodide.

*Analysis.*—$C_{14}H_{12}N_2O_2$; mol. wt. 240.3. Calculated: C, 69.99; H, 5.03%; N, 11.66%. Found: C, 69.80%; H, 5.10%; N, 11.56%.

EXAMPLE 14

Using a procedure analogous to that described in Example 2, 5-ethyl-5,6-dihydro-6-oxo-10-methyl-pyrido[2,3-b][1,4]benzoxazepine, B.P. 160–162° C. at 0.02 mm. Hg, M.P. 74–76° C., was prepared from 5,6-dihydro-6-oxo-10-methyl-pyrido[2,3-b][1,4]benzoxazepine, potassium hydroxide and ethyliodide.

*Analysis.*—$C_{15}H_{14}N_2O_2$; mol. wt. 254.3. Calculated: C, 70.85%; H, 5.55%; N, 11.01%. Found: C, 70.85%; H, 5.70%; N, 10.93%.

EXAMPLE 15

Using a procedure analogous to that described in Example 2, 5-(β-dimethylamino-ethyl)-5,6-dihydro-6-oxo-10-methyl-pyrido[2,3-b][1,4]benzoxazepine, B.P. 203°C. at 0.04 mm. Hg, M.P. 110–113° C. (recrystallized from cyclohexane), was prepared from 5,6-dihydro-6-oxo-10-methyl-pyrido[2,3-b][1,4]benzoxazepine, potassium hydroxide and β-dimethylaminoethyl chloride.

*Analysis.*—$C_{17}H_{19}N_3O_2$; mol. wt. 297.4. Calculated: C, 68.67%; H, 6.44%; N, 14.13%. Found: C, 68.80%; H, 6.59%; N, 14.38%.

EXAMPLE 16

Using a procedure analogous to that described in Example 2, 5-methyl-5,6-dihydro-6-oxo-8-acetamidopyrido[2,3-b][1,4]benzoxazepine, M.P. 245–246° C. (recrystallized from acetonitrile), of the formula

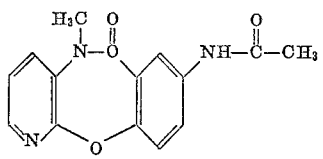

was prepared from 5,6-dihydro-6-oxo-8-acetamido-pyrido[2,3-b][1,4]benzoxazepine, potassium hydroxide and methyliodide.

*Analysis.*—$C_{15}H_{13}N_3O_3$; mol. wt. 283.3. Calculated: C, 63.60%; H, 4.65%; N, 14.83%. Found: C, 63.50%; H, 4.60%; N, 14.97%.

EXAMPLE 17

Using a procedure analogous to that described in Example 7, 5-isobutyl-5,6-dihydro-6-oxo-pyrido[2,3-b][1,4]benzoxazepine, M.P. 137–138° C. (recrystallized from aqueous acetonitrile), was prepared from 5,6-dihydro-6-oxo-pyrido[2,3-b][1,4]benzoxazepine, potassium and isobutyliodide.

*Analysis.*—$C_{16}H_{16}N_2O_2$; mol. wt. 268.3. Calculated: C, 71.63%; H, 6.01%; N, 10.44%. Found: C, 71.50%; H, 5.99%; N, 10.47%.

EXAMPLE 18

Using a procedure analogous to that described in Example 7, 5-(γ-dimethylamino-n-propyl)-5,6-dihydro-6-oxo-pyrido[2,3-b][1,4]benzoxazepine, M.P. 93–95° C. (recrystallized from gasoline), was prepared from 5,6-dihydro-6-oxo-pyrido[2,3-b][1,4]benzoxazepine, potassium and γ-dimethylamino-n-propyl chloride.

*Analysis.*—$C_{17}H_{19}N_3O_2$; mol. wt. 297.4. Calculated: C, 68.67%; H, 6.44%; N, 14.13%. Found: C, 68.70%; H, 6.66%; N, 14.38%.

EXAMPLE 19

Using a procedure analogous to that described in Example 7, 5-[γ-(N'-methyl-piperazino)-n-propyl]5,6-dihydro-6-oxo-10-methyl-pyrido[2,3-b][1,4]benzoxazepine, B.P. 227–230° C. at 0.04 mm. Hg, was prepared from 5,6-dihydro-6-oxo-10-methyl-pyrido[2,3-b][1,4]benzoxazepine, potassium and γ-(N'-methyl-piperazino)-n-propyl chloride.

*Analysis.*—$C_{21}H_{26}N_4O_2$; mol. wt. 366.5. Calculated: C, 68.83%; H, 7.15%; N, 15.29%. Found: C, 69.00%; H, 7.27%; N, 15.04%.

EXAMPLE 20

Using a procedure analogous to that described in Example 7, 5-methyl-5,6-dihydro-6-oxo-8-tert.butylpyrido[2,3-b][1,4]benzoxazepine, M.P. 141–143° C. (recrystallized from gasoline), was prepared from 5,6-dihydro-6-oxo-8-tert.butyl-pyrido[2,3-b][1,4]benzoxazepine, potassium and methyliodide.

*Analysis.*—$C_{17}H_{18}N_2O_2$; mol. wt. 282.3. Calculated: C, 72.32%; H, 6.43%; N, 9.92%. Found: C, 72.30%; H, 6.56%; N, 10.27%.

EXAMPLE 21

Using a procedure analogous to that described in Example 7, 5-[γ-(N'-methyl-piperazino)-n-propyl]-5,6-dihydro-6-oxo-8-tert.butyl-pyrido[2,3-b][1,4]benzoxazepine, B.P. 230–235° C. at 0.03 mm. Hg, was prepared from 5,6 - dihydro-6-oxo-8-tert.butyl-pyrido[2,3-b][1,4] benzoxazepine, potassium and γ-(N'-methyl-piperazino)-n-propyl chloride.

*Analysis.*—C₂₄H₃₂N₄O₂; mol. wt. 408.5. Calculated: C, 70.55%; H, 7.90%; N, 13.72%. Found: C, 69.90%; H, 8.08%; N, 13.65%.

EXAMPLE 22

Using a procedure analogous to that described in Example 7, 5-methyl-5,6-dihydro-6-oxo-9-methoxy pyrido [2,3-b][1,4]benzoxazepine, M.P. 150–151° C. (recrystallized from water), was prepared from 5,6-dihydro-6-oxo-9-methoxy-pyrido[2,3-b][1,4]benzoxazepine, potassium and methyliodide.

*Analysis.*—C₁₄H₁₂N₂O₃; mol. wt. 256.3. Calculated: C, 65.63%; H, 4.72%; N, 10.93. Found: C, 65.20%; H, 4.80%; N, 10.82%.

EXAMPLE 23

Using a procedure analogous to that described in Example 2, 5-allyl-5,6-dihydro-6-oxo-pyrido[2,3-b][1,4] benzoxazepine, M.P. 85–87° C. (recrystallized from a mixture of ether and gasoline), of the formula

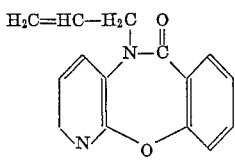

was prepared from 5,6-dihydro-6-oxo-pyrido[2,3-b][1,4] benzoxazepine, potassium hydroxide and allylbromide.

*Analysis.*—C₁₅H₁₂N₂O₂; mol. wt. 252.3. Calculated: C, 71.41%; H, 4.80%; N, 11.10%. Found: C,71.15%; H, 4.86%; N, 11.21%.

EXAMPLE 24

Using a procedure analogous to that described in Example 2, 5 - allyl-5,6-dihydro-6-oxo-8-tert.butyl-pyrido [2,3-b][1,4]benzoxazepine, M.P. 121–123° C. (recrystallized from aqueous ethanol), was prepared from 5,6-dihydro-6-oxo - 8 - tert.butyl-pyrido[2,3-b][1,4]benzoxazepine, potassium hydroxide and allylbromide.

*Analysis.*—C₁₉H₂₀N₂O₂; mol. wt. 308.4. Calculated: C, 74.00%; H, 6.54%; N, 9.08%. Found: C, 73.80%; H, 6.75%; N, 9.18%.

EXAMPLE 25

Using a procedure analogous to that described in Example 7, 5-p-methoxybenzyl-5,6-dihydro-6-oxo-pyrido [2,3-b][1,4]benzoxazepine, M.P. 113–115° C. (recrystallized from methanol), of the formula

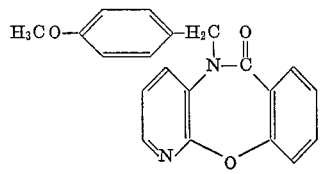

was prepared from 5,6-dihydro-6-oxo-pyrido[2,3-b][1,4] benzoxazepine, potassium and p-methoxybenzyl chloride.

*Analysis.*—C₂₀H₁₆N₂O₃; mol. wt. 332.3. Calculated: C, 72.27%; H, 4.86%; N, 8.43%. Found: C, 72.40%; H, 5.00%; N, 8.62%.

EXAMPLE 26

Using a procedure analogous to that described in Example 7, 5-[γ-(N'-methyl-piperazino)-n-propyl]-5,6-dihydro-6-oxo-8-chloro-pyrido[2,3 - b][1,4]benzoxazepine, B.P. 225–230° C. at 0.08 mm. Hg, of the formula

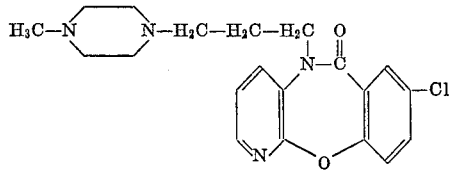

was prepared from 5,6-dihydro-6-oxo-8-chloro-pyrido [2,3-b][1,4]benzoxazepine, potassium and γ-(N'-methyl-piperazino)-n-propyl chloride.

*Analysis.*—C₂₀H₂₃ClN₄O₂; mol. wt. 386.9. Calculated: C, 62.09%; H, 5.99%; N, 14.47%; Cl, 9.17%. Found: C, 61.70%; H, 6.15%; N, 14.27%; Cl, 9.45%.

EXAMPLE 27

Using a procedure analogous to that described in Example 7, 5-[γ-(N'methyl-piperazino)-n-propyl]-5,6-dihydro-6-oxo - 9 - methoxy-pyrido[2,3-b][1,4]benzoxazepine, B.P. decomp. at 0.05 mm. Hg, of the formula

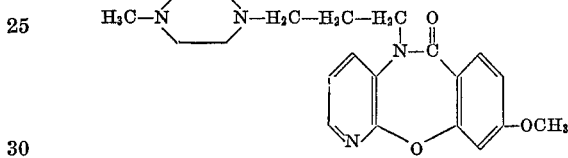

was prepared from 5,6-dihydro-6-oxo-9-methoxy-pyrido [2,3-b][1,4]benzoxapine, potassium and λ-(N'-methyl-piperazino)-n-propyl chloride. Its picrate had a melting point of 152–154° C. (recrystallized from aqueous dimethylformamide).

*Analysis.*—C₃₃H₃₂N₁₀O₁₇; mol. wt. 840.7. Calculated: C, 47.15%; H, 3.85%. Found: C, 47.10%; H, 3.94%.

EXAMPLE 28

Using a procedure analogous to that described in Example 7, 5-methyl-5,6-dihydro-6-oxo-8-amino-pyrido [2,3-b][1,4]benzoxazepine, M.P. 162.5–163.5° C. (recrystallized from isopropanol), of the formula

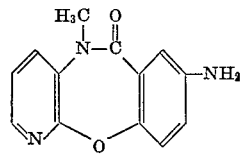

was prepared from 5,6-dihydro-6-oxo-8-diacetamido-pyrido[2,3-b][1,4]benzoxazepine, potassium and methyliodine, and subsequent hydrolysis of the reaction product.

*Analysis.*—C₁₃H₁₁N₃O₂; mol wt. 241.3. Calculated: C, 64.72%; H, 4.60%; N, 17.42%. Found: C, 64.40%; H, 4.60%; N, 17.68%.

EXAMPLE 29

Using a procedure analogous to that described in Example 7, 5-methyl-5,6 - dihydro-6-oxo - 8-acetyl-pyrido [2,3-b][1,4]benzoxepine, M.P. 186–188° C. (recrystallized from acetone), of the formula

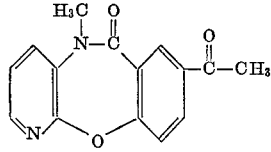

was prepared from 5,6-dihydro-6-oxo-8-acetyl-pyrido [2,3-b][1,4]benzoxazepine, potassium and methyliodine.

*Analysis.*—C₁₅H₁₂N₂O₃; mol wt. 268.3. Calculated: C, 67.16%; H, 4.51%; N, 10.44%. Found: C, 66.90%; H, 4.75%; N, 10.46%.

EXAMPLE 30

Using a procedure analogous to that described in Example 7, 5-β-methallyl-5,6-dihydro-6-oxo-pyrido[2,3-b][1,4]benzoxazepine, M.P. 106–107° C. (recrystallized from cyclohexane), of the formula

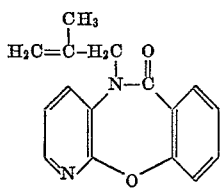

was prepared from 5,6-dihydro-6-oxo-pyrido[2,3-b][1,4]benzoxazepine, potassium and β-methallyl chloride.

*Analysis.*—$C_{16}H_{14}N_2O_2$; mol. wt. 266.3 Calculated: C, 72.16%; H, 5.30%; N, 10.52%. Found: C, 72.30%; H, 5.39%; N, 10.76%.

EXAMPLE 31

Using a procedure analogous to that described in Example 7, 5-β-chloroallyl-5,6-dihydro-6-oxo-pyrido [2,3-b][1,4]benzoxazepine, M.P. 106–108° C. (recrystallized from cyclohexane), of the formula

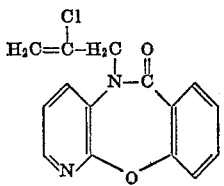

was prepared from 5,6-dihydro-6-oxo-pyrido[2,3-b][1,4] benzoxazepine, potassium and 1,2-dichloropropene-(2).

*Analysis.*—$C_{15}H_{11}ClN_2O_2$; mol wt. 286.7. Calculated: C, 62.83%; H, 3.87; N, 9.77%; Cl, 12.36%. Found: C, 63.10%; H, 4.02%; N, 9.52%; Cl, 12.35%.

The novel pyridobenzoxazepine compounds according to the present invention, that is, those embraced by Formula I above and their non-toxic, pharmacologically acceptable acid addition salts, have useful pharmacodynamic properties. More particularly, they exhibit highly effective antipyretic, sedative, anticonvulsive, antiphlogistic, analgesic, antitussive and antiemetic activites in warm-blooded animals. In addition, those compounds of the Formula I wherein R is a basic substituent and their non-toxic acid addition salts exhibit histaminolytic and reserpine-antagonistic activities in warm-blooded animals.

For pharmaceutical purposes, the compounds according to the present invention are administered to warm-blooded animals by the oral or parental route as active ingredients in conventional dosage unit compositions, that is, compositions in dosage unit form consisting essentially of an inert pharmaceutical carrier and one dosage unit of the active ingredient, such as tablets, coated pills, suppositories, solutions, suspensions and the like. One dosage unit pursuant to the present invention is from 25 to 300 mgm, preferably 60 to 150 mgm.

The dosage unit compositions comprising a compound of the present invention as an active ingredient may also contain one or more other active ingredients which potentiate or complement the pharmacodynamic action of the pyridobenzoxazepine ingredient, such as another sedative and/or analgesic compound as well as a compound which increases the output of bronchial secretion.

The following examples illustrate a few dosage unit compositions comprising a compound of the invention as an active ingredient. The parts are parts by weight.

EXAMPLE 32

Tablets

The tablet composition is compounded from the following ingredients:

| | Parts |
|---|---|
| 5 - methyl - 5,6 - dihydro-6-oxo-pyrido[2,3-b] 1,4] benzoxazepine | 60.0 |
| Secondary calcium phosphate | 33.0 |
| Corn starch | 30.0 |
| Gelatin | 2.0 |
| Talcum | 4.0 |
| Magnesium stearate | 1.0 |
| Total | 130.0 |

Compounding procedure

The pyridobenzoxazepine compound, the secondary calcium phosphate and the corn starch are thoroughly admixed with each other, and the mixture is moistened with an aqueous 10% solution of the gelatin. The moist mixture is forced through a 1.5 mm.-mesh screen, and the moist granulate formed thereby is dried at 45° C. The dry granulate is then passed through a 1.0 mm.-mesh screen, the talcum and magnesium stearate are added, and the mixture is blended and pressed into 130 mgm.-tablets. Each tablet contains 60 mgm. of the active ingredient.

EXAMPLE 33

Coated pills

The tablets obtained in Example 32 are coated with a thin shell consisting essentially of sugar and talcum, and the coating is polished with beeswax. Each coated pill weighs approximately 200 mgm.

EXAMPLE 34

Suppositories

The suppository composition is compounded from the following ingredients:

| | Parts |
|---|---|
| 5 - methyl - 5,6-dihydro-6-oxo-pyrido[2,3-b][1,4] benzoxazepine | 100.0 |
| Cocoa butter | 1600.0 |
| Total | 1700.0 |

Compounding procedure

The cocoa butter is melted, and at 40° C. the finely pulverized pyridobenzoxazepine compound is stirred in and the mixture is homogenized. The composition is then cooled to 35° C. and poured into cooled suppository molds each holding 1700 mgm. of the composition. Each suppository contains 100 mgm. of the active ingredient.

EXAMPLE 35

Coated pills with phenobarbital and codeine phosphate

The pill core composition is compounded from the following ingredients:

| | Parts |
|---|---|
| 5 - methyl - 5,6-dihydro-6-oxo-pyrido[2,3-b][1,4] benzoxazepine | 60.0 |
| 5-Ethyl-5-phenylbarbituric acid | 30.0 |
| Codeine phosphate | 10.0 |
| Lactose | 68.0 |
| Corn starch | 30.0 |
| Colloidal silicic acid | 20.0 |
| Magnesium stearate | 2.0 |
| Total | 220.0 |

Compounding procedure

One-half of the required amount of colloidal silicic acid is admixed with the lactose, the corn starch, the pyridobenzoxazepine compound, the barbituric acid and the codeine phosphate, and the mixture is moistened with an aqueous 20% suspension of the remaining amount of colloidal silicic acid which has been prepared at 55° C. The moist mixture is forced through a 1.5 mm.-mesh screen, the moist granulate obtained thereby is dried at 40° C., and the dry granulate is again forced through the screen. It is then admixed with the magnesium stearate, and the mixture is pressed into 220 mgm.-pill cores. The pill cores are finally coated with a thin shell consisting essentially of talcum and sugar, and the coated pills are polished with beeswax. Each pill weighs approximately 320 mgm. and contains 60 mgm. of the pyridobenzoxazepine compound, 30 mgm. of phenobarbital and 10 mgm. of codeine phosphate.

EXAMPLE 36

Syrup

The syrup composition is compounded from the following ingredients:

|  | Parts |
|---|---|
| 5 - methyl - 5,6-dihydro-6-oxopyrido[2,3-b][1,4]benzoxazepine | 0.6 |
| Sodium 5-ethyl-5-phenylbarbiturate | 0.4 |
| Codeine hydrochloride | 0.1 |
| N-(2-Amino-3,5-dibromobenzyl)-N-methyl-cyclohexylammonium chloride | 0.04 |
| Ascorbic acid | 2.0 |
| Colloidal silicic acid | 3.0 |
| Carboxymethyl cellulose, high viscosity | 0.5 |
| p-Hydroxybenzoic acid methyl ester | 0.07 |
| p-Hydroxybenzoic acid propyl ester | 0.03 |
| Saccharin sodium | 0.1 |
| Flavoring | 1.5 |
| Glycerin | 5.0 |
| Sugar | 32.0 |
| Distilled water | 69.66 |
| Total | 115.00 |

Compounding procedure

The distilled water is heated to 80° C., and the p-hydroxybenzoic acid esters and the cyclohexylammonium salt are successively dissolved therein. Thereafter, the colloidal silicic acid is suspended in the solution, and the saccharin sodium as well as a mixture consisting of the carboxymethyl cellulose and the sugar are dissolved in the suspension. The composition is then cooled to room temperature and the ascorbic acid, the codeine hydrochloride and the sodium phenobarbital are dissolved therein in that order. Susequently, the finely pulverized pyridobenzoxazepine compound is suspended in the composition with the aid of an immersion homogenizer, and then the glycerin and the flavoring are blended in .5 cc. of the finished syrup contain 30 mgm. of the pyridobenzoxazepine compound, 20 mgm. of sodium phenobarbital, 5 mgm. of codeine hydrochloride, 2 mgm. of the cyclohexylammonium salt and 100 mgm. of ascorbic acid.

Although the above dosage unit composition examples illustrate only one specific compound of the present invention as an active ingredient, it should be understood that any of the other compounds embraced by Formula I or a non-toxic acid addition salt thereof may be substituted for the pyridobenzoxazepine ingredient in Examples 32 through 35. Similarly, the amounts of the various active ingredients may be varied to meet particular requirements, as may the amount and nature of the inert ingredients.

While the present invention has been illustrated with the aid of certain specific embodiments thereof, it will be readily apparent to others skilled in the art that the invention is not limited to these particular embodiments, and that various changes and modifications may be made without departing from the spirit of the invention.

I claim:
1. A compound selected from the group consisting of 5,6 - dihydro-6-oxo-pyrido[2,3-b][1,4]benzoxazepines of the formula

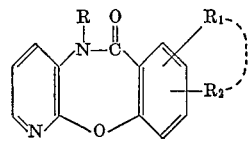

wherein

R is selected from the group consisting of lower alkyl, halo-lower alkyl, lower alkoxy-lower alkyl, di-lower alkylamino-lower alkyl, piperidino-lower alkyl, morpholino-lower alkyl, N'-lower alkyl-piperazino-lower alkyl, lower alkoxybenzyl, halo-benzyl, lower alkenyl and halo-lower alkenyl, and $R_1$ and $R_2$ are each selected from the group consisting of hydrogen, halogen, lower alkyl, lower alkoxy, lower alkanoyl, amino, lower alkanoyl-amino and, together with each other and adjacent carbon atoms of the benzene ring to which they are attached, from a benzo ring, and their non-toxic, pharmacologically acceptable acid addition salts.

2. A compound selected from the group consisting of 5,6 - dihydro-6-oxo-pyrido[2,3-b][1,4]benzoxazepines of the formula

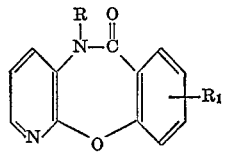

wherein

R is selected from the group consisting of lower alkyl, chloro-lower alkyl, methoxy-lower alkyl, dimethylamino-lower alkyl, piperidino-lower alkyl, morpholino-lower alkyl, N'-methyl-piperazino-lower alkyl, methoxybenzyl, chlorobenzyl, allyl, methallyl and chloroallyl, and $R_1$ is selected from the group consisting of hydrogen, chlorine, lower alkyl, methoxy, acetyl and amino, acetamido, and their non-toxic, pharmacologically acceptable acid addition salts.

3. 5 - methyl - 5,6 - dihydro-6-oxo-pyrido[2,3-b][1,4]benzoxazepine.

4. 5 - ethyl - 5,6 - dihydro - 6-oxo-pyrido[2,3-b][1,4]benzoxazepine.

5. 5 - ($\beta$ - dimethylamino - ethyl) - 5,6-dihydro-6-oxo-pyrido[2,3-b][1,4]benzoxazepine.

6. 5 - methyl - 5,6 - dihydro - 6 - oxo-8-chloro-pyrido[2,3-b][1,4]benzoxazepine.

7. 5-[$\gamma$-(N'-methyl-piperazino)-n-propyl]-5,6-dihydro-6-oxo-pyrido[2,3-b][1,4]benzoxazepine.

8. 5,10 - dimethyl - 5,6 - dihydro-6-oxo-pyrido[2,3-b][1,4]benzoxazepine.

9. 5 - allyl - 5,6 - dihydro - 6-oxo-pyrido[2,3-b][1,4]benzoxazepine.

No references cited

HENRY R. JILES, Primary Examiner

R. T. BOND, Assistant Examiner

U.S. Cl. X.R.

424—263

PO-1050
(5/69)

UNITED STATES PATENT OFFICE
CERTIFICATE OF CORRECTION

Patent No. 3,459,737            Dated  August 5, 1969

Inventor(s) Günther Schmidt

It is certified that error appears in the above-identified patent and that said Letters Patent are hereby corrected as shown below:

Column 3, line 25, in the formula "$H_3C - O$" should read
$$--H_3C \quad O$$
$$\quad\quad | \quad \| $$
$$\quad\quad N - C \quad --.$$

Column 4, line 37, "(0.4 gm-atom)" should read --(0.04 gm-atom)-
line 50, in the formula "$H_3C - O$" should read
$$--H_3C \quad O$$
$$\quad\quad | \quad \| $$
$$\quad\quad N - C \quad --.$$

Column 10, line 33, "benzoxapine" should be --benzoxazepine--;
            52, "diacetamido-"    "    "   --acetamido- --;
            54, "iodine"           "    "   --iodide--;
            62, "benzoxepine"      "    "   --benzoxazepine--;
            72, "methyliodine"     "    "   --methyliodide--.

SIGNED AND
SEALED
MAR 31 1970

(SEAL)
Attest:

Edward M. Fletcher, Jr.
Attesting Officer

WILLIAM E. SCHUYLER, JR.
Commissioner of Patents